United States Patent
Han et al.

(10) Patent No.: US 10,740,167 B2
(45) Date of Patent: Aug. 11, 2020

(54) MULTI-CORE PROCESSOR AND CACHE MANAGEMENT METHOD THEREOF

(71) Applicant: Electronics and Telecommunications Research Institute, Daejeon (KR)

(72) Inventors: Jin Ho Han, Seoul (KR); Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 174 days.

(21) Appl. No.: 15/832,862

(22) Filed: Dec. 6, 2017

(65) Prior Publication Data

US 2018/0157549 A1 Jun. 7, 2018

(30) Foreign Application Priority Data

Dec. 7, 2016 (KR) .......................... 10-2016-0166172
Oct. 23, 2017 (KR) .......................... 10-2017-0137655

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0724* (2013.01); *G06F 11/0751* (2013.01);
(Continued)

(58) Field of Classification Search
CPC ............. G06F 11/1683; G06F 11/1658; G06F 11/165; G06F 11/1641; G06F 9/223; G06F 9/5094; G06F 13/1689
See application file for complete search history.

(56) References Cited

U.S. PATENT DOCUMENTS 4,486,826 A * 12/1984 Wolff .................. G06F 11/1625
714/44
5,732,209 A * 3/1998 Vigil ................ G01R 31/31856
714/30
(Continued)

FOREIGN PATENT DOCUMENTS

JP          2012-63828 A    3/2012
KR    10-2015-0061546 A    6/2015
(Continued)

OTHER PUBLICATIONS

Mancuso, "Real-Time Cache Management Framework for Multi-core Architectures", 2013, IEEE, p. 1-10 (Year: 2013).*

*Primary Examiner* — Bryce P Bonzo
*Assistant Examiner* — Jeison C Arcos
(74) *Attorney, Agent, or Firm* — Rabin & Berdo, P.C.

(57) ABSTRACT

A multi-core processor connected to main memory or peripheral device and having dual modular redundancy mode in which each processor performs the same task includes a first processor which generates first write-in data by performing the task, and writes the first write-in data to the main memory or peripheral device after fault detection operation on the first write-in data, a second processor which generates second write-in data by performing the task, and prevents writing of the second write-in data to the main memory or peripheral device after the fault detection operation on the second write-in data, and a fault manager which performs the fault detection operation by comparing the first write-in data with the second write-in data in the mode, wherein the first write-in data is written to the main memory using first data cache, which is managed using dirty bit indicating whether to synchronize with the main memory.

13 Claims, 6 Drawing Sheets

(51) Int. Cl.
*G06F 12/0815* (2016.01)
*G06F 12/0804* (2016.01)
*G06F 12/0868* (2016.01)
*G06F 11/16* (2006.01)

(52) U.S. Cl.
CPC ...... *G06F 11/1641* (2013.01); *G06F 12/0804* (2013.01); *G06F 12/0815* (2013.01); *G06F 12/0868* (2013.01); *G06F 11/1675* (2013.01); *G06F 2212/1048* (2013.01); *G06F 2212/60* (2013.01); *G06F 2212/621* (2013.01)

(56) References Cited

U.S. PATENT DOCUMENTS

| | | | |
|---|---|---|---|
| 6,035,416 A * | 3/2000 | Abdelnour | G06F 11/0757 714/10 |
| 6,519,710 B1 * | 2/2003 | Saunders | G06F 11/1679 709/213 |
| 6,591,335 B1 | 7/2003 | Sade et al. | |
| 7,055,060 B2 * | 5/2006 | Nguyen | G06F 11/1641 714/11 |
| 7,328,391 B2 | 2/2008 | Hart et al. | |
| 7,337,334 B2 * | 2/2008 | Kuhlmann | G06F 1/3203 713/300 |
| 7,797,512 B1 * | 9/2010 | Cheng | G06F 9/455 712/10 |
| 7,966,514 B2 | 6/2011 | Surasinghe | |
| 8,051,247 B1 | 11/2011 | Favor et al. | |
| 8,533,572 B2 | 9/2013 | Lu et al. | |
| 8,812,907 B1 * | 8/2014 | Bissett | G06F 11/1484 714/20 |
| 8,924,772 B2 | 12/2014 | Abe | |
| 9,529,654 B2 | 12/2016 | Kwon et al. | |
| 9,575,692 B2 | 2/2017 | Han et al. | |
| 2004/0068618 A1 * | 4/2004 | Hooker | G06F 9/3812 711/141 |
| 2004/0123201 A1 * | 6/2004 | Nguyen | G06F 11/1641 714/736 |
| 2005/0050373 A1 * | 3/2005 | Orenstien | G06F 1/206 713/320 |
| 2005/0154851 A1 * | 7/2005 | Charles | G06F 12/023 711/170 |
| 2005/0223178 A1 * | 10/2005 | Garcia | G06F 9/52 711/150 |
| 2005/0223274 A1 * | 10/2005 | Bernick | G06F 9/3851 714/11 |
| 2006/0107114 A1 * | 5/2006 | Michaelis | G06F 11/0721 714/25 |
| 2007/0022348 A1 * | 1/2007 | Racunas | G06F 11/1641 714/735 |
| 2007/0074011 A1 * | 3/2007 | Borkar | G06F 1/3203 712/227 |
| 2007/0101173 A1 * | 5/2007 | Fung | G06F 1/3209 713/300 |
| 2007/0282572 A1 * | 12/2007 | Larus | G06F 9/5066 703/2 |
| 2007/0294689 A1 * | 12/2007 | Garney | G06F 9/5077 718/1 |
| 2008/0005437 A1 * | 1/2008 | Gupta | G06F 13/1663 710/241 |
| 2008/0005539 A1 * | 1/2008 | Velhal | G06F 11/008 712/220 |
| 2008/0163239 A1 * | 7/2008 | Sugumar | G06F 9/5088 718/105 |
| 2008/0168220 A1 * | 7/2008 | Gill | G06F 12/0804 711/113 |
| 2008/0168234 A1 * | 7/2008 | Gill | G06F 12/0804 711/134 |
| 2008/0244354 A1 * | 10/2008 | Wu | G06F 11/1407 714/755 |
| 2009/0094481 A1 * | 4/2009 | Vera | G06F 1/206 714/11 |
| 2009/0172228 A1 * | 7/2009 | Zimmer | G06F 9/4405 710/260 |
| 2009/0172690 A1 * | 7/2009 | Zimmer | G06F 9/5077 718/104 |
| 2009/0307660 A1 * | 12/2009 | Srinivasan | G06F 8/314 717/114 |
| 2009/0313489 A1 * | 12/2009 | Gunther | G06F 1/3203 713/300 |
| 2010/0153700 A1 * | 6/2010 | Capps, Jr. | G06F 9/3842 713/100 |
| 2011/0010709 A1 * | 1/2011 | Anand | G06F 9/45533 718/1 |
| 2011/0087943 A1 * | 4/2011 | Mangione-Smith | G06F 13/4022 714/748 |
| 2011/0161630 A1 * | 6/2011 | Raasch | G06F 9/30196 712/205 |
| 2011/0208948 A1 * | 8/2011 | Knight | G06F 11/1497 712/31 |
| 2012/0072746 A1 * | 3/2012 | Sotomayor | G06F 1/324 713/320 |
| 2014/0108778 A1 * | 4/2014 | Molloy | G06F 9/223 713/100 |
| 2014/0181596 A1 * | 6/2014 | Rusu | G06F 11/3409 714/47.3 |
| 2014/0380019 A1 * | 12/2014 | Wilkerson | G06F 9/3836 712/30 |
| 2015/0067310 A1 * | 3/2015 | Henry | G06F 1/3237 713/1 |
| 2015/0309862 A1 * | 10/2015 | Han | G06F 11/1064 714/801 |
| 2017/0364421 A1 * | 12/2017 | Dusanapudi | G06F 11/203 |
| 2019/0004582 A1 * | 1/2019 | Rotem | G06F 1/3296 |

FOREIGN PATENT DOCUMENTS

| | | |
|---|---|---|
| KR | 10-1560497 B1 | 10/2015 |
| KR | 10-2015-0122429 A | 11/2015 |

* cited by examiner

MULTI-CORE PROCESSOR AND CACHE MANAGEMENT METHOD THEREOF

CROSS-REFERENCE TO RELATED APPLICATIONS

This U.S. non-provisional patent application claims priority under 35 U.S.C. § 119 of Korean Patent Application Nos. 10-2016-0166172, filed on Dec. 7, 2016, and 10-2017-0137655, filed on Oct. 23, 2017, the entire contents of which are hereby incorporated by reference.

BACKGROUND

The present disclosure herein relates to a processor, and more particularly, to a multi-core processor including a plurality of processors and a cache management method therefor.

Central processing units (CPUs) are widely applied in the field of system semiconductors. A processor may read a program from a main memory to perform a calculation according to a procedure. Furthermore, the processor may store a calculation result (i.e., processing result) in the main memory. A cache may be disposed between the processor and the main memory to improve the performance and speed of data exchange between the processor and the main memory. A processing result of the processor or a portion of a program stored in the main memory may be stored in the cache. The cache has higher read/write speeds in comparison with the main memory exemplified by a dynamic random access memory (DRAM). In addition, in the case where the cache is used between the processor and the main memory, an operation fault of the processor may be monitored or a monitored fault may be corrected.

Recently, a multi-core technology and a cache memory have become more important for providing high performance and high reliability required for systems. Furthermore, a multi-core technology and a technology for providing cache coherence are being actively applied to various mobile devices to satisfy the requirement of high performance A technology for recognizing and recovering from a fault of a CPU is necessarily required for a multi-core CPU from which high performance and high reliability are required.

SUMMARY

The present disclosure provides a cache structure or a processor structure capable of easily detecting and correcting a fault of a multi-core system having a variable redundancy function.

An embodiment of the inventive concept provides a multi-core processor connected to a main memory and having a dual modular redundancy mode in which each processor performs the same task, the multi-core processor including: a first processor configured to generate first write-in data by performing the task, and write the first write-in data to the main memory or a peripheral device after completion of a fault detection operation on the first write-in data; a second processor configured to generate second write-in data by performing the task, and prevent the second write-in data from being transferred to the main memory or the peripheral device after completion of the fault detection operation on the second write-in data; and a fault manager configured to perform the fault detection operation by comparing the first write-in data with the second write-in data in the dual modular redundancy mode, wherein the first write-in data is written to the main memory or the peripheral device using a first data cache, and the first data cache is managed using a dirty bit indicating whether to synchronize with the main memory.

In an embodiment of the inventive concept, a cache management method for a multi-core processor having a dual modular redundancy mode in which a first processor and a second processor perform the same task, includes: comparing first write-in data generated by the first processor as a result of the task and second write-in data generated by the second processor as a result of the task; storing the first write-in data in a first data cache and the second write-in data in a second data cache; and writing the first write-in data stored in the first data cache to a main memory according to a result of the comparing, wherein an operation of writing from the second data cache to the main memory is prevented.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept will be described in detail with reference to the accompanying drawings so that those skilled in the art can easily implement the inventive concept.

Figure 1:
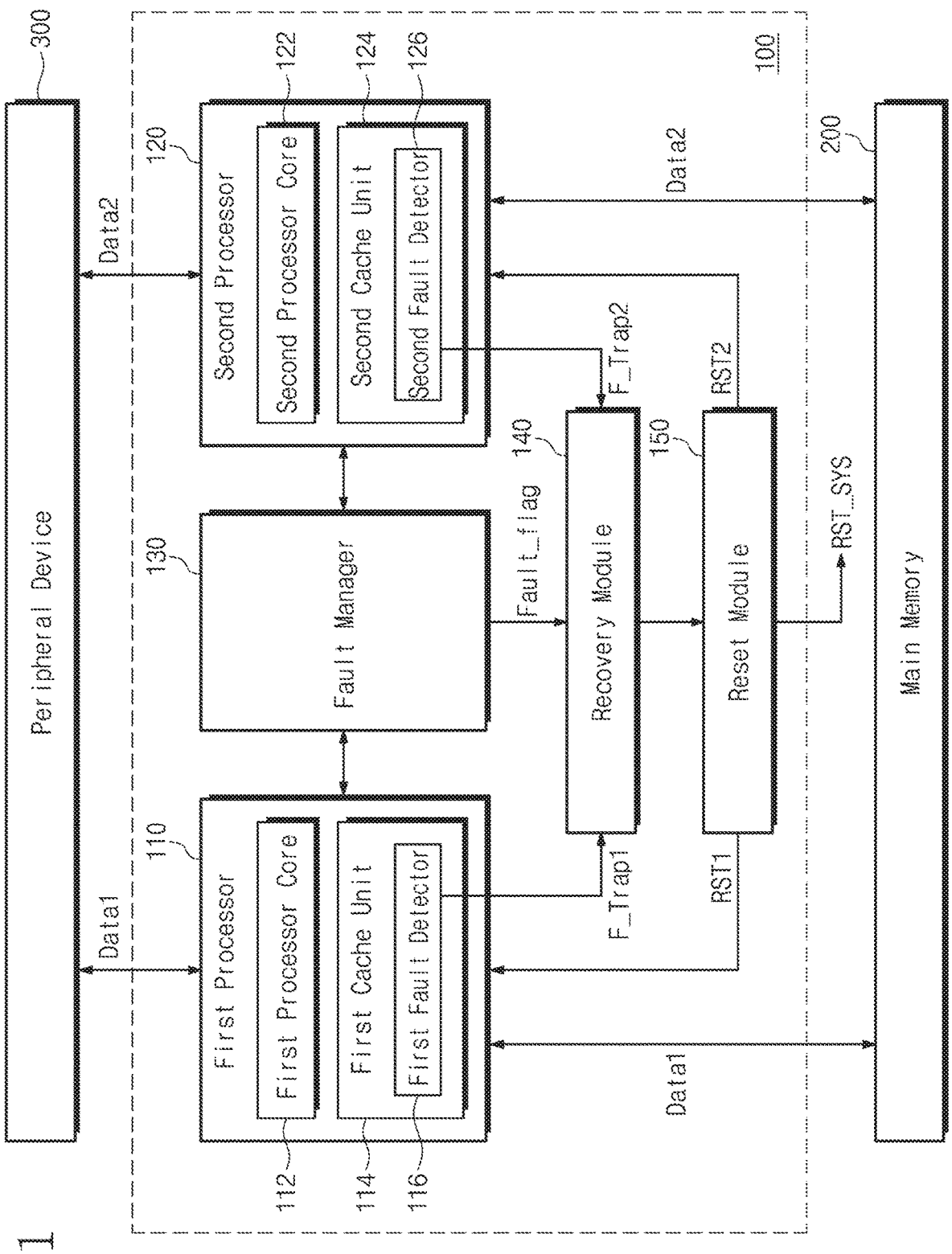
FIG. 1 is a block diagram illustrating a multi-core processor according to an embodiment of the inventive concept.

FIG. 1 is a block diagram illustrating a multi-core processor according to an embodiment of the inventive concept. Referring to FIG. 1, a multi-core processor 100 according to an embodiment of the inventive concept may include a first processor 110, a second processor 120, a fault manager 130, a recovery module 140, and a reset module 150. The multi-core processor 100 accesses a main memory 200 or a peripheral device 300 to read or write data.

The multi-core processor 100 according to an embodiment of the inventive concept may operate in two operation modes, i.e., a dual-core (DC) mode and a dual-modular redundancy (DMR) mode. In the DC mode, the first processor 110 and the second processor 120 individually process tasks, and individually access the main memory 200 or the peripheral device 300. On the contrary, in the DMR mode, the first processor 110 operates as a leading core, and the second processor 120 operates as a trailing core. That is, in the DMR mode, the first processor 110 and the second processor 120 perform the same task. However, in the DMR mode, only the first processor 110, which is a leading core, is authorized to write data to the main memory 200. In the DMR mode, the first processor 110 has an access right to read or write data from/to the peripheral device 300. In the DMR mode, the second processor 120, which is a trailing core, only has a right to read data from the main memory 200, and is controlled so as not to apply a calculation result to the main memory 200 or not to change registers of the peripheral device 300.

The first processor 110 may include a first processor core 112 and a first cache unit 114. The first processor core 112 performs various calculations for performing a task in the first processor 110. The first cache unit 114 provides a cache function to the first processor core 112.

In the DC mode, the first processor 110 exchanges data Data1 with the main memory 200 or the peripheral device 300 using the first cache unit 114. The data Data1 includes readout data read from the main memory 200 and write-in data which is generated by the first processor 110 and written in the main memory 200. For example, the first processor 110 may read a program loaded on the main memory 200 to sequentially execute the program. Here, the first processor 110 stores, in the first cache unit 114, data which is required to be read frequently or updated. Furthermore, the first processor 110 stores, in the first cache unit 114, data generated from an execution result of a program. Data cached in the first cache unit 114 may include a dirty bit indicating whether the data matches data of the main memory 200 or the peripheral device 300. Synchronization between data updated on the first cache unit 114 and the main memory 200 is managed by means of the dirty bit. The first cache unit 114 may include a first fault detector 116 for detecting presence of a fault in data of the first cache unit 114. The first fault detector 116 detects a fault in data stored in the first cache unit 114, and transfers, to the recovery module 140, a trap signal F_trap1 for recovering from the fault.

On the contrary, in the DMR mode, the data stored in the first cache unit 114 of the first processor 110 is also transferred to the fault manager 130. Data for which fault detection has been completed by the fault manager 130 may be transferred to the main memory 200. In particular, in the DMR mode, the first processor 110 may read data from the main memory 200 or the peripheral device 300. Readout data provided from the main memory 200 is stored in the first cache unit 114, and is transferred to the fault manager 130. The fault manager 130 transfers, to a second cache unit 124 of the second processor 120, data read from the peripheral device 300 among the transferred readout data. That is, in the DMR mode, the first processor 110 may have an access right to read or write data from/to the main memory 200 or the peripheral device 300. The first processor 110 may read a program loaded on the main memory 200 to sequentially execute the program. Here, the first processor 110 stores, in the first cache unit 114, data which is required to be read frequently or at high speed.

The second processor 120 may include a second processor core 122 and the second cache unit 124. The second processor core 122 performs various calculations for processing various programs in the second processor 120. The second cache unit 124 provides a cache function to the second processor core 122. The second processor 120 exchanges data Data2 with the main memory 200 or the peripheral device 300 only in the DC mode.

In the DC mode, the second processor 120 may read programs loaded on the main memory 200 to sequentially execute the programs. Here, the second processor 120 stores, in the second cache unit 124, data which is updated frequently or at high speed. The second processor 120 stores, in the second cache unit 124, data generated from an execution result of a program. In the DC mode in which the second processor 120 operates independently from the first processor 110, data cached in the second cache unit 124 may include a dirty bit for synchronization with the main memory 200. The second cache unit 124 may include a second fault detector 126 for detecting presence of a fault in data cached in the second cache unit 124. The second fault detector 126 detects a fault in data stored in the second cache unit 124, and transfers, to the recovery module 140, a trap signal F_trap2 for recovering from the fault.

On the contrary, in the DMR mode, the data stored in the second cache unit 124 of the second processor 120 is prevented from being written to the main memory 200 and is only transferred to the fault manager 130. The fault manager 130 may compare the data (including an address) transferred from the first processor 110 with the data transferred from the second processor 120 to determine presence of a fault of the multi-core processor 100. Data returned from the fault manager 130 is stored in the second cache unit 124. However, in the DMR mode, the second processor 120 reads data from the main memory 200 but does not write data to the main memory 200. Therefore, in the DMR mode, it is not necessary for the second cache unit 124 to perform dirty bit management for the main memory 200. In addition, in the DMR mode, the second processor 120 does not access the peripheral device 200. The fault manager 130 may receive, from each of the first processor 110 and the second processor 120, register information DMR_EN for activating the DMR mode. When values of DMR registers (not shown) of the first processor 110 and the second processor 120 indicate enablement (DMR_EN), the fault manager 130 activates a fault detection operation according to the DMR mode. That is, in the DMR mode, the fault manager 130 compare data provided from the first processor 110 and the second processor 120 to determine whether a fault of a calculation occurs. When the data provided from the first processor 110 and the second processor 120 are not identical, the fault manager 130 determines an operation fault of the dual-core processor 100. Furthermore, the fault manager 130 transfers a fault flag signal Fault_flag to the recovery module 140. On the contrary, when the values of the DMR registers (not shown) written in the first processor 110 and the second processor 120 indicate disablement (DMR_DIS), the fault manager 130 only performs a reset operation on each core according to the DC mode without performing the fault detection operation.

When an operation fault of the first processor 110 and the second processor 120 is detected, the recovery module 140 performs various control operations for recovering from a detected fault. In the DC mode, the recovery module 140 may perform a fault recovery operation in response to the fault trap signal F_Trap1 from the first fault detector 116 of the first processor 110. Furthermore, the recovery module 140 may perform the fault recovery operation in response to the fault trap signal F_Trap2 from the second fault detector 126 of the second processor 120. Furthermore, in the DMR mode, the recovery module 140 may perform the fault recovery operation in response to the fault flag signal Fault_flag provided from the fault manager 130.

The reset module 150 may reset the first processor 110 or the second processor 120 in response to control by the recovery module 140. In addition, the reset module 150 may generate, in response to control by the recovery module 140, a system reset signal RST_SYS for resetting a system including the dual-core processor 100.

The main memory 200 may store an operating system (OS), application programs, and various data generated by the dual-core processor 100. In the DC mode, the main memory 200 may be accessed from both the first processor 110 and the second processor 120. However, in the DMR mode, the first processor 110, which corresponds to a leading core, is allowed to read and write data from/to the main memory 200. In the DMR mode, the second processor 120, which corresponds to a trailing core, is allowed to only read data from the main memory 200.

As described above, the dual-core processor 100 according to an embodiment of the inventive concept has different operation modes, i.e., the DC mode and the DMR mode. Furthermore, caches which are managed in the first processor 110 and the second processor 120 may be differentially managed according to the respective modes. In particular, in the DMR mode, the fault manager 130 according to an embodiment of the inventive concept may easily detect a fault by monitoring the caches of the first processor 110 and the second processor 120. That is, in the DMR mode, the second processor 120, which is a trailing core, operates the caches in such a manner that the second processor 120 processes a program but is prevented from writing data to the main memory 200. Therefore, the performance of fault detection and recovery may be improved in the DMR mode.

Figure 2:
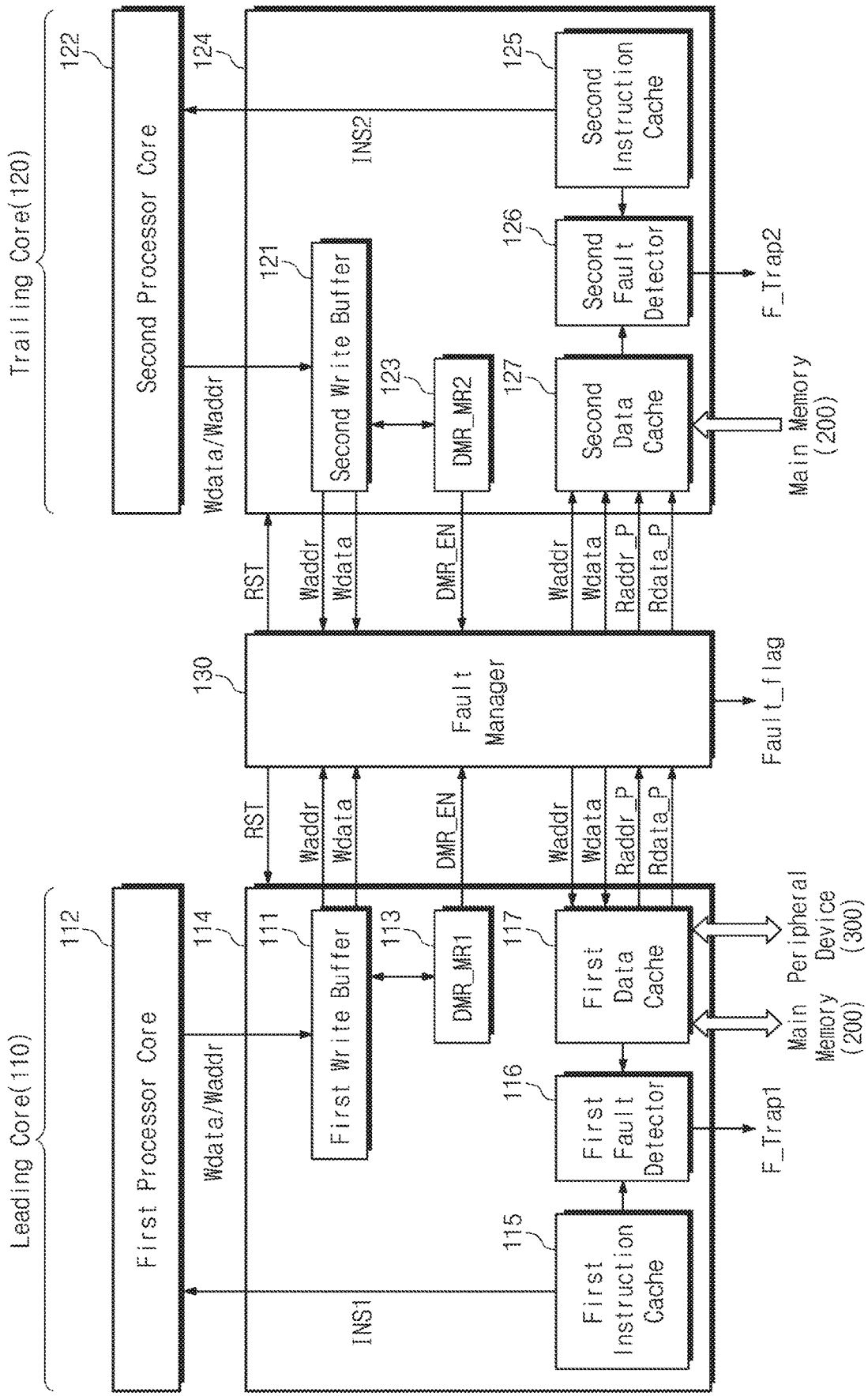
FIG. 2 is a block diagram illustrating in detail a function of a dual-core processor in a dual modular redundancy (DMR) mode according to an embodiment of the inventive concept.

FIG. 2 is a block diagram illustrating in detail a function of a dual-core processor in the DMR mode according to an embodiment of the inventive concept. Referring to FIG. 2, in the DMR mode, the first processor 110 operates as a leading core, and the second processor 120 operates as a trailing core. Furthermore, the fault manager 130 detects an operation fault on the basis of data provided from the caches of the first processor 110 and the second processor 120.

For an operation according to the DMR mode, the first cache unit 114 included in the first processor 110 may include a first write buffer 111, a first DMR register 113, a first instruction cache 115, the first fault detector 116, and a first data cache 117. Furthermore, the second cache unit 124 included in the second processor 120 may include a second write buffer 121, a second DMR register 123, a second instruction cache 125, the second fault detector 126, and a second data cache 127.

To activate the DMR mode, the first processor core 112 and the second processor core 122 writes DMR enablement DMR_EN in the DMR registers 113 and 123 respectively. Then, the first processor 110 and the second processor 120, which have been performing tasks individually in the DC mode, switch to a leading core and a trailing core respectively. That is, in the DMR mode, the first processor core 112 and the second processor core 122 perform the same task. Here, the first processor 110 and the second processor 120 may have different operating frequencies. For example, the operating frequency of the first processor 110, which is a leading core, may be higher than the operating frequency of the second processor 120, which is a trailing core. Furthermore, according to values of the DMR registers 113 and 123, the fault manager 130 may activate a fault detection operation for comparing data generated by the first processor 110 and the second processor 120.

In the DMR mode, the first processor 110, which operates as a leading core, may read or write data from/to the main memory 200. That is, the first processor 110 may transfer a write-in address Waddr and write-in data Wdata to the main memory 200, or may receive a readout address Raddr and readout data Rdata from the main memory 200. On the contrary, in the DMR mode, the second processor 120 is allowed to only read data from the main memory 200. In the DMR mode, the second processor 120 generates the write-in address Waddr and the write-in data Wdata. However, in the DMR mode, the second processor 120 does not transfer the write-in address Waddr and the write-in data Wdata to the main memory 200. Instead, in the DMR mode, the second processor 120 provides the write-in address Waddr and the write-in data Wdata only to the fault manager 130.

In detail, in the DMR mode, the first processor core 112, which operates as a leading core, may generate and write the write-in address Waddr and the write-in data Wdata in the first write buffer 111. Then, the write-in address Waddr and the write-in data Wdata written in the first write buffer 111 are transferred to the fault manager 130. Likewise, the second processor core 122, which operates as a trailing core, may perform the same task as the first processor core 112. The second processor core 122 may generate and write the write-in address Waddr and the write-in data Wdata in the second write buffer 121. Then, the write-in address Waddr and the write-in data Wdata written in the second write buffer 121 are transferred to the fault manager 130.

In the DMR mode, the fault manager 130 compares the write-in addresses Waddr and the write-in data Wdata provided from the first write buffer 111 and the second write buffer 121. Furthermore, after the comparison, the fault manager 130 returns the write-in address Waddr and the write-in data Wdata to the first data cache 117 and the second data cache 127. If the write-in addresses Waddr and the write-in data Wdata provided from the first write buffer 111 and the second write buffer 121 are different from each other, the fault manager 130 determines an operation fault. Furthermore, the fault manager 130 may transfer a fault flag or fault trap information to the recovery module 140 (see FIG. 1). Here, the first fault detector 116 included in the first cache unit 114 or the second fault detector 126 included in the second cache unit 124 may monitor a fault of the first data cache 117 and the second data cache 127 and may transfer fault trap information to the recovery module 140.

The write-in address Waddr and the write-in data Wdata stored in the first data cache 117 may use a dirty bit to synchronize with the main memory 200 both in the DC mode and in the DMR mode. However, in the DMR mode, it is not necessary to apply a dirty bit to the write-in address Waddr and the write-in data Wdata stored in the second data cache 127. This is because data writing from the second data cache 127 to the main memory 200 does not occur in the DMR mode.

In the DMR mode, a readout address Raddr_P and readout data Rdata_P transferred from the peripheral device 300 are preferentially stored only in the first data cache 117. Furthermore, the readout address Raddr_P and the readout data Rdata_P stored in the first data cache 117 may be transferred to the second data cache 127 after being transferred to the fault manager 130.

In particular, in the DMR mode, the operating frequency of the first processor 110, which is a leading core, may be higher than the operating frequency of the second processor 120, which is a trailing core. In the DMR mode, the first processor 110 and the second processor 120 may individually perform a reading operation on the main memory 200. Accordingly, in the DMR mode, even though the same task is performed, processing times of the first processor 110 and the second processor 120 may randomly differ from each other due to the different operating frequencies. Due to asynchronism caused by the difference between operating frequencies, a temporal redundancy may be additionally provided.

In addition, the readout address Raddr_P and the readout data Rdata_P transferred from the peripheral device 300 are preferentially stored only in the first data cache 117. Furthermore, the readout address Raddr_P and the readout data Rdata_P stored in the first data cache 117 may be transferred to the second data cache 127 after being transferred to the fault manager 130.

As described above, in the DMR mode, the fault manager 130 compares the write-in addresses Waddr and the write-in data Wdata of the first processor 110 and the second processor 120 to detect occurrence of a fault. Furthermore, the fault manager 130 returns the write-in address Waddr and the write-in data Wdata to the respective data caches 117 and 127 of the first processor 110 and the second processor 120. Here, only the write-in address Waddr and the write-in data Wdata of the first data cache 117, which corresponds to a leading core, may be transferred to the main memory 200.

Figure 3:
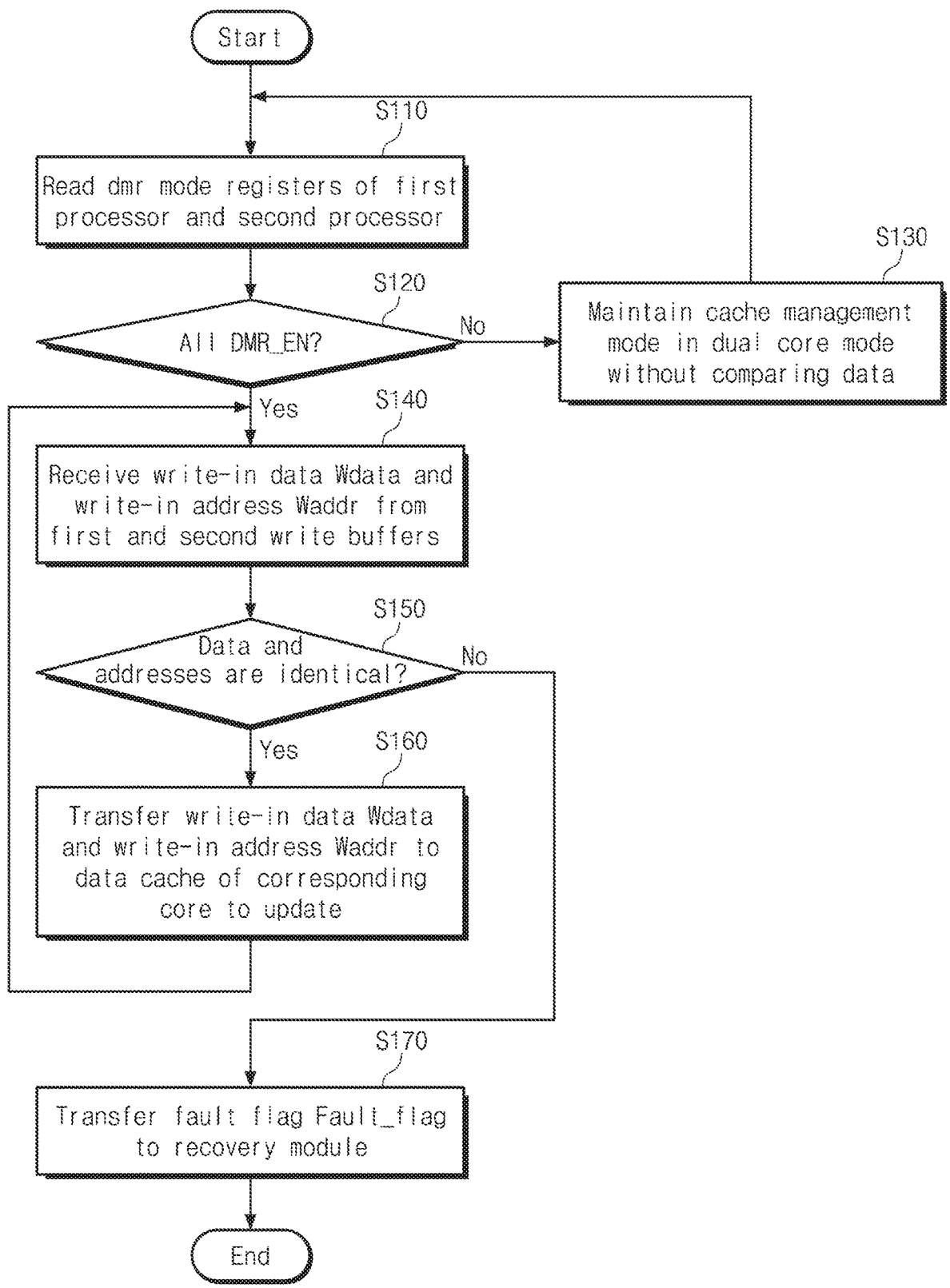
FIG. 3 is a schematic flowchart illustrating operation of a fault manager.

FIG. 3 is a schematic flowchart illustrating operation of a fault manager. Referring to FIG. 3, in the DMR mode, the fault manager 130 may detect a fault by monitoring data of the first processor 110 and the second processor 120 which perform the same task. In the DMR mode, the first processor 110 and the second processor 120 may perform the same task, but may operate at different operating frequencies. For example, in the DMR mode, the operating frequency of the first processor 110, which is a leading core, may be higher than the operating frequency of the second processor 120, which is a trailing core.

In operation S110, the fault manager 130 reads the DMR registers 113 and 123 included in the first cache unit 114 and the second cache unit 124 respectively. The DMR registers 113 and 123 are set by the first processor core 112 and the second processor core 122.

In operation S120, the fault manager 130 refers to values stored in the DMR registers 113 and 123 to switch between operations. When the values stored in the DMR registers 113 and 123 indicate an enabled state DMR_EN (YES), the process proceeds to operation S140. On the contrary, when the values stored in the DMR registers 113 and 123 do not indicate the enabled state DMR_EN (NO), the process precedes to operation S130.

In operation S130, the fault manager 130 may perform a function of a previous DC mode. For example, the fault manager 130 may only serve to provide the reset signal RST to the first cache unit 114 and the second cache unit 124.

In operation S140, the fault manager 130 receives the write-in addresses Waddr and the write-in data Wdata provided from the first write buffer 111 and the second write buffer 121.

In operation S150, the fault manager 130 compares the write-in addresses Waddr and the write-in data Wdata generated by the first processor 110 and the second processor 120 which have performed the same task. When the write-in addresses Waddr and the write-in data Wdata generated by the first processor 110 and the second processor 120 are identical (YES), the process proceeds to operation S160. On the contrary, when the write-in addresses Waddr and the write-in data Wdata generated by the first processor 110 and the second processor 120 are different (NO), the process proceeds to operation S170.

In operation S160, the fault manager 130 transfers the write-in address Waddr and the write-in data Wdata to the first data cache 117 and the second data cache 127. The write-in address Waddr and the write-in data Wdata provided to the first data cache 117 may be updated using a dirty bit. However, the data of the second data 127 is not required to be synchronized with the main memory 200 using a dirty bit. This is because the data of the second data cache 127 is prevented from being written to the main memory 200 in the DMR mode. Thereafter, the process returns to operation S140 to detect a fault.

In operation S170, the fault manager 130 may determine that a fault has occurred in an operation of the DMR mode, and may transfer a fault flag or fault trap information to the recovery module 140 (see FIG. 1). Here, the first fault detector 116 included in the first cache unit 114 or the second fault detector 126 included in the second cache unit 124 may monitor a fault of the first data cache 117 and the second data cache 127 and may transfer fault trap information to the recovery module 140.

Described above is the operation of the fault manager 130 for detecting and recovering from a fault in the DMR mode in which the first processor 110 and the second processor 120 perform the same task. The fault manager 130 may detect an operation fault by comparing input data only in the DMR mode.

Figure 4:
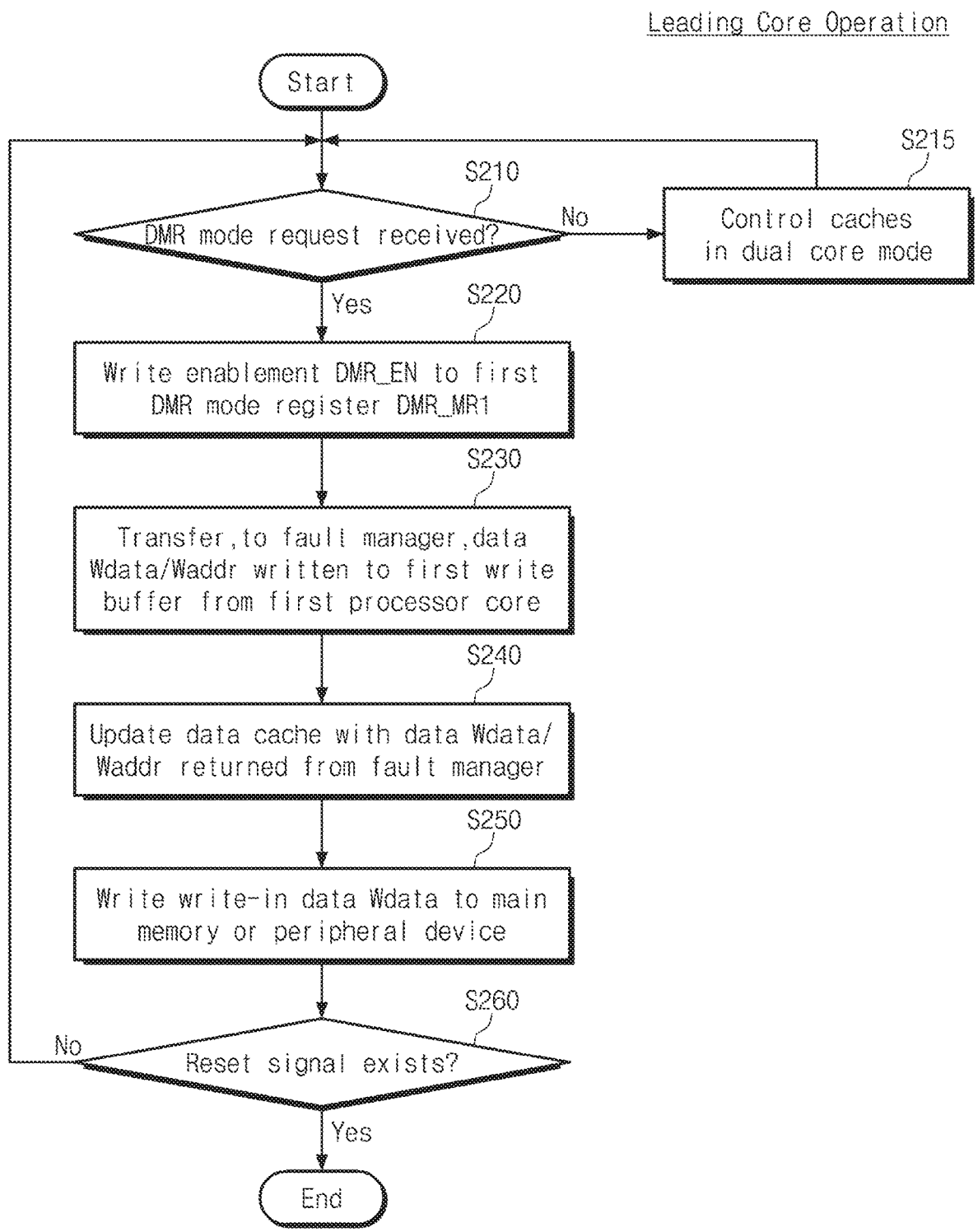
FIG. 4 is a flowchart illustrating operation of a leading core.

FIG. 4 is a schematic flowchart illustrating operation of a first processor corresponding to a leading core. Referring to FIG. 4, the first processor 110 performs a task independently from the second processor 120 in the DC mode. On the contrary, the first processor 110 performs the same task as the second processor 120 in the DMR mode. That is, the first processor 110 operating as a leading core may access the main memory 200 regardless of an operation mode.

In operation S210, the first processor 110 monitors whether a request for execution of the DMR mode has been received from software or a user. When it is determined that the request for execution of the DMR mode exists (YES), the process proceeds to operation S220. However, when it is determined that the request for execution of the DMR mode does not exist (NO), the process proceeds to operation S215.

In operation S215, the first processor 110 may control the first cache unit 114 according to the DC mode. That is, the first processor 110 may transfer the write-in address Waddr and the write-in data Wdata written in the first write buffer 111 to the first data cache 117 without transferring the foregoing data to the fault manager 130. Furthermore, the first processor 110 may transfer the readout address Raddr and the readout data Rdata read from the main memory 200 to the first processor core 112 without intervention of the fault manager 130.

In operation S220, the first processor 110 sets the DMR register 113 in response to the request for execution of the DMR mode. The first processor 110 may write an enabled state DMR_EN in the DMR register 113. Then, the fault manager 130 may perform a fault detection operation activated in the DMR mode.

In operation S230, the first processor 110 writes, in the first write buffer 111, the write-in address Waddr and the write-in data Wdata generated by the first processor core 112. The first processor 110 transfers the write-in address Waddr and the write-in data Wdata written in the first write buffer 111 to the fault manager 130. The fault manager 130 may perform a fault detection operation according to the DMR mode using the write-in address Waddr and the write-in data Wdata. Furthermore, the fault manager 130 may return the write-in address Waddr and the write-in data Wdata to the first processor 110.

In operation S240, the first processor 110 writes, in the first data cache 117, the write-in address Waddr and the write-in data Wdata returned from the fault manager 130. Furthermore, the first processor 110 may manage the write-in address Waddr and the write-in data Wdata of the first data cache 117 using a dirty bit.

In operation S250, the first processor 110 writes, in the main memory 200 or the peripheral device 300, the write-in data Wdata updated in the first data cache 117.

In operation S260, the first processor 110 monitors whether the reset signal RST is provided. When the first processor 110 is required to be reset due to a fault detected by the fault manager 130 or the first fault detector 116, the reset signal RST may be provided. When the reset signal RST exists (YES), various operations of the first processor 110 may be terminated. On the contrary, when the reset signal RST does not exist (NO), the process may return to operation S210 for monitoring an operation mode of the first processor 110.

Figure 5:
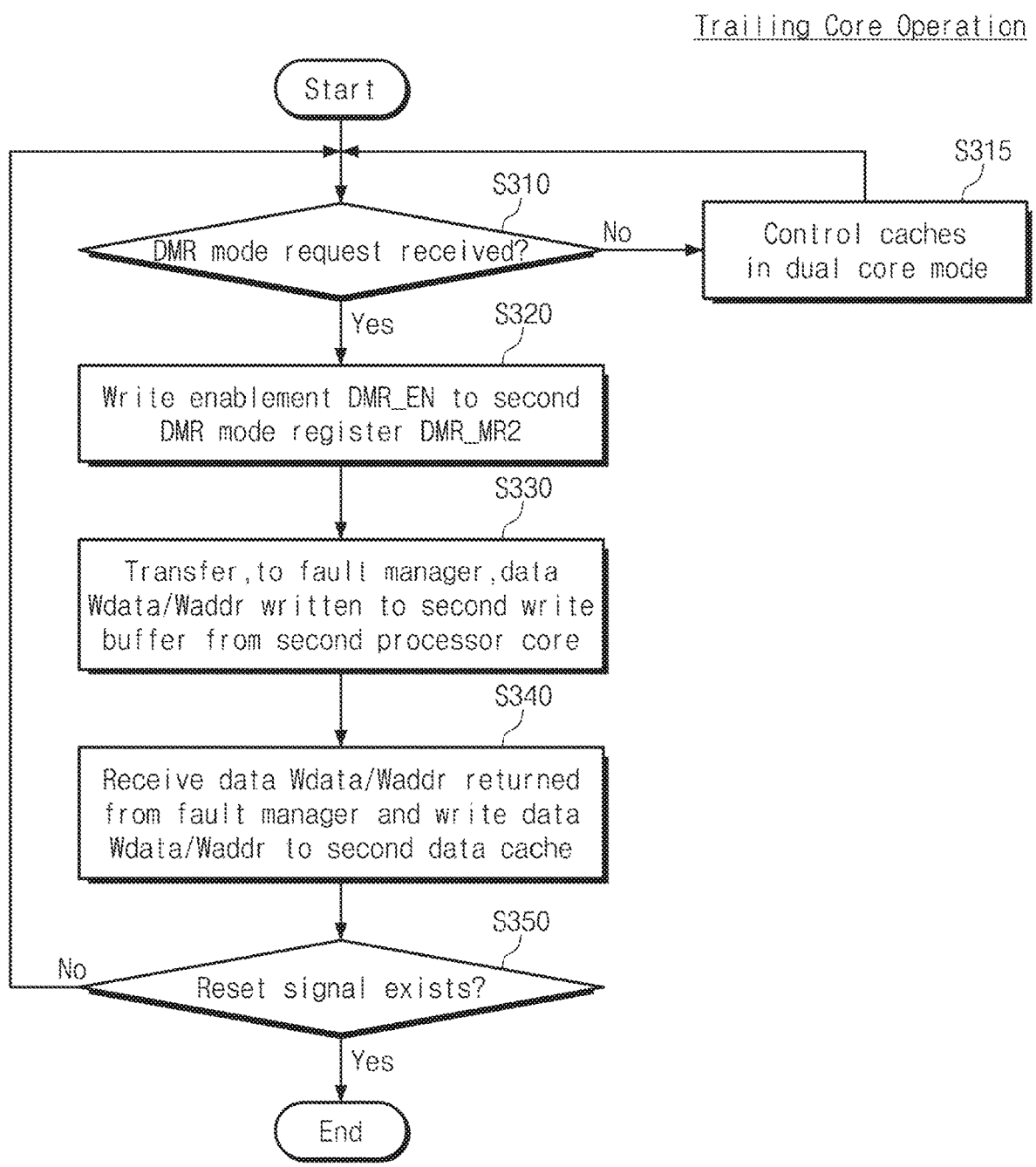
FIG. 5 is a flowchart illustrating operation of a trailing core.

FIG. 5 is a schematic flowchart illustrating operation of a second processor corresponding to a trailing core. Referring to FIG. 5, the second processor 120 performs a task independently from the first processor 110 in the DC mode. On the contrary, the second processor 120 performs the same task as the first processor 110 in the DMR mode. The second processor 120, which operates as a trailing core, may read or write data from/to the main memory 200 in the DC mode. However, in the DMR mode, the second processor 120 is allowed to only read data from the main memory 200 and is prevented from writing data thereto.

In operation S310, the second processor 120 monitors whether a request for execution of the DMR mode has been received from software or a user. When it is determined that the request for execution of the DMR mode exists (YES), the process proceeds to operation S320. However, when it is determined that the request for execution of the DMR mode does not exist (NO), the process proceeds to operation S315.

In operation S315, the second processor 120 may control the second cache unit 124 in to the DC mode. That is, the second processor 120 may transfer the write-in address Waddr and the write-in data Wdata written in the second write buffer 121 to the second data cache 127 without transferring the foregoing data to the fault manager 130. In the DC mode, the second processor 120 may directly write, to the main memory 200 or the peripheral device 300, the write-in address Waddr and the write-in data Wdata of the second data cache 127. Furthermore, in the DC mode, the second processor 120 may transfer the readout address Raddr and the readout data Rdata read from the main memory 200 to the second processor core 122 without intervention of the fault manager 130.

In operation S320, the second processor 120 sets the second DMR register 123 in response to the request for execution of the DMR mode. The second processor 120 may write an enabled state DMR_EN as a DMR mode state in the DMR register 123. Then, the fault manager 130 may perform a fault detection operation activated in the DMR mode.

In operation S330, the second processor 120 writes, in the second write buffer 121, the write-in address Waddr and the write-in data Wdata generated by the second processor core 122. The second processor 120 transfers the write-in address Waddr and the write-in data Wdata written in the second write buffer 121 to the fault manager 130. The fault manager 130 may detect a fault of the DMR mode using the write-in address Waddr and the write-in data Wdata. Furthermore, the fault manager 130 may return the write-in address Waddr and the write-in data Wdata to the second processor 120.

In operation S340, the second processor 120 writes, in the second data cache 127, the write-in address Waddr and the write-in data Wdata returned from the fault manager 130. Here, since the write-in address Waddr and the write-in data Wdata stored in the second data cache 127 are not required to be written to the main memory 200 or the peripheral device 300, it is not necessary to perform synchronization based on a dirty bit.

In operation S350, the second processor 120 monitors whether the reset signal RST is provided. When the second processor 120 is required to be reset due to a fault detected by the fault manager 130 or the second fault detector 126, the reset signal RST may be provided. When the reset signal RST exists (YES), various operations of the second processor 120 may be terminated. On the contrary, when the reset signal RST does not exist (NO), the process may return to operation S310 for monitoring an operation mode of the second processor 120.

Described above are operations of the first processor 110, the second processor 120, and the fault manager 130 in the DMR mode. In the DMR mode, the first processor 110 and the second processor 120 perform the same task. In another embodiment, in the DMR mode, the first processor 110 and the second processor 120 may perform the same task under different operating frequency conditions. Furthermore, the fault manager 130 may detect a fault by comparing data provided from the first processor 110 and the second processor 120 which have performed the same task.

Figure 6:
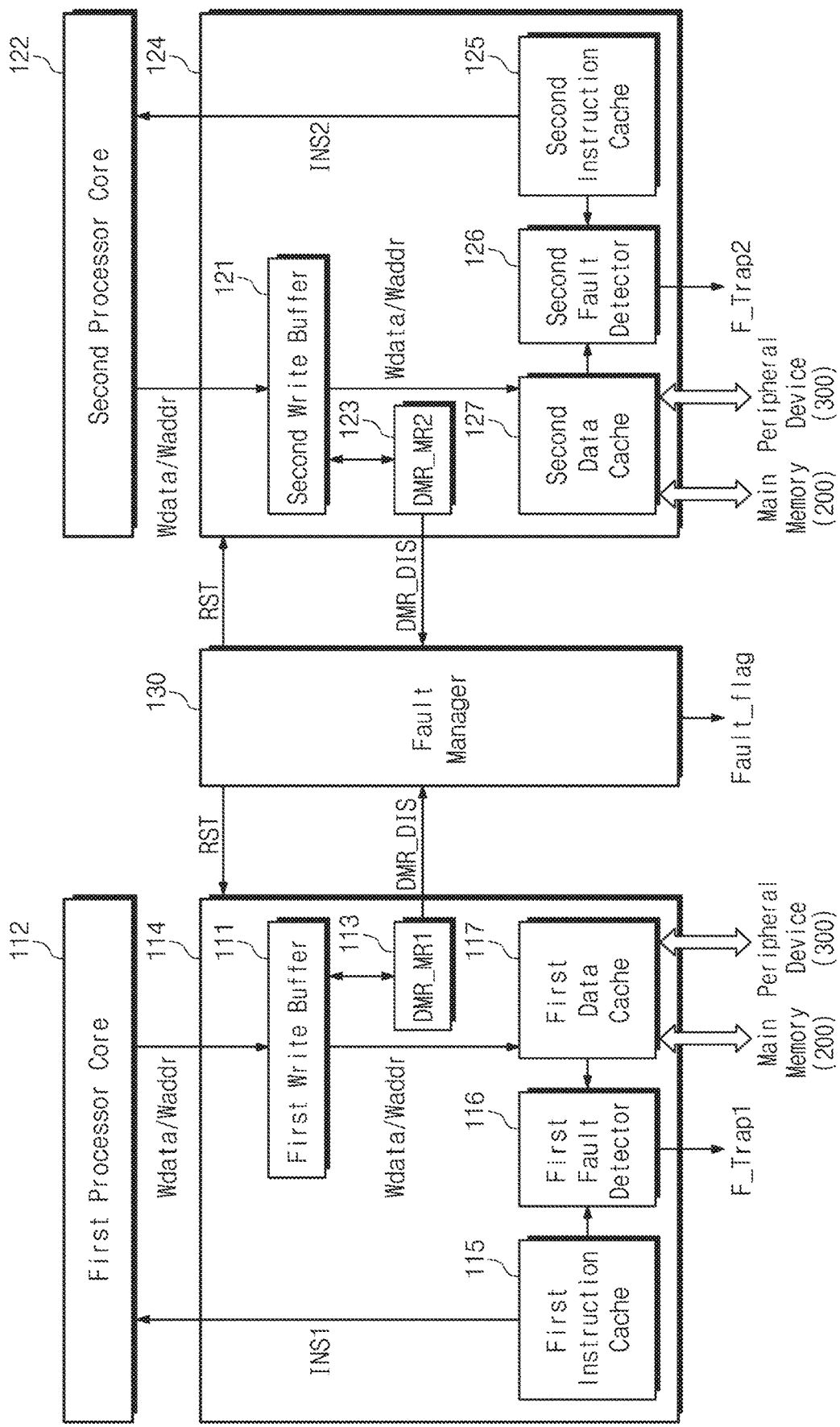
FIG. 6 is a block diagram illustrating a function of a dual-core processor in a dual core (DC) mode according to an embodiment of the inventive concept.

FIG. 6 is a block diagram illustrating a function of a dual-core processor in the DC mode according to an embodiment of the inventive concept. Referring to FIG. 6, in the DC mode, the first processor 110 and the second processor 120 may individually perform tasks, and may individually access the main memory 200 or the peripheral device 300. Here, the fault detection operation of the fault manager 130 is inactivated. The first processor core 112, the first cache unit 114, the second processor core 122, the second cache unit 124, and the fault manager 130 are substantially the same as those illustrated in FIG. 2. However, since the DMR modes of the DMR registers 113 and 123 are set to a disabled state DMR_DIS, the first processor 110 and the second processor 120 may individually access the main memory 200.

The first cache unit 114 included in the first processor 110 may include the first write buffer 111, the first DMR register 113, the first instruction cache 115, the first fault detector 116, and the first data cache 117. Furthermore, the second cache unit 124 included in the second processor 120 may include the second write buffer 121, the second DMR register 123, the second instruction cache 125, the second fault detector 126, and the second data cache 127.

In the DC mode, the first processor 112 and the second processor 122 write the disabled state DMR_DIS as the DMR modes in the DMR registers 113 and 123. Then, the first processor 110 and the second processor 120 individually perform tasks in the DC mode. The fault manager 130 may suspend the operation of comparison between the data generated by the first processor 110 and the second processor 120.

In the DC mode, the first processor 110 may operate in the same manner as in the DMR mode, excepting the operation of transferring data to the fault manager 130. That is, the first processor 110 writes and reads data to/from the main memory 200 regardless of the fault manager 130. That is, the write-in address Waddr and the write-in data Wdata generated by the first processor core 112 may be directly transferred from the first write buffer 111 to the first data cache 117. Furthermore, the write-in address Waddr and the write-in data Wdata stored in the first data cache 117 may be written to the main memory 200.

In the DC mode, the second processor 120 may generate data regardless of operation of the first processor 110, and may write the generated data to the main memory 200 or the peripheral device 300. That is, the second processor 120 writes and reads data to/from the main memory 200 or the peripheral device 300 regardless of tasks of the fault manager 130 or the first processor 110. For example, the write-in address Waddr and the write-in data Wdata generated by the second processor core 122 may be directly transferred from the second write buffer 121 to the second data cache 117. Furthermore, the write-in address Waddr and the write-in data Wdata stored in the second data cache 127 may be written to the main memory 200 or the peripheral device 300.

As described above, in the DC mode, the fault manager 130 may be disabled, and the first processor 110 and the second processor 120 may individually perform tasks, and may individually access the main memory 200 or the peripheral device 300.

The dual-core processor 100 has been described as an example of a multi-core processor in order to describe embodiments of the inventive concept. However, it could be understood that a plurality of processors are not limited to a dual-core processor. That is, three or more processors may operate as a leading core or a trailing core according to an operation mode. In this case, the fault manager 130 may detect a fault by comparing data stored in caches of each processor.

A processor system according to an embodiment of the inventive concept efficiently detects and corrects a fault of a multi-core having a variable redundancy function. Therefore, high reliability of a multi-core processor may be provided.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A multi-core processor connected to a main memory or a peripheral device and having a dual modular redundancy (DMR) mode in which each processor performs a same task, the multi-core processor comprising:
    a first processor configured to generate first write-in data by performing the task, and write the first write-in data to the main memory or the peripheral device after completion of a fault detection operation on the first write-in data;
    a second processor configured to generate second write-in data by performing the task, and prevent the second write-in data from being written to the main memory or the peripheral device after completion of the fault detection operation on the second write-in data; and
    a fault manager configured to perform the fault detection operation by comparing the first write-in data with the second write-in data in the dual modular redundancy mode,
    wherein the first write-in data is written to the main memory using a first data cache, and the first data cache is managed using a dirty bit indicating whether to synchronize with the main memory,
    wherein the first processor comprises:
        a first processor core configured to generate the first write-in data; and
        a first cache unit comprising a first data cache configured to transfer the first write-in data to the main memory in the dual modular redundancy mode, and
    wherein the first cache unit comprises:
        a first write buffer configured to store the first write-in data transferred from the first processor core;
        a first DMR register which is connected to the first write buffer and to which information indicating whether to activate the dual modular redundancy mode is written; and
        a first fault detector configured to detect a fault in the first write-in data stored in the first data cache.

2. The multi-core processor of claim 1, wherein the second processor comprises:
    a second processor core configured to generate the second write-in data; and
    a second cache unit which provides the second write-in data to the fault manager but is prevented from writing data to the main memory in the dual modular redundancy mode.

3. The multi-core processor of claim 2, wherein the fault manager is configured to return the second write-in data to the second processor based on detecting a fault in the DMR mode, and wherein the second cache unit comprises:
    a second write buffer configured to store the second write-in data and transfer the stored second write-in data to the fault manager;
    a second DMR register which is connected to the second write buffer and to which information indicating whether to activate the dual modular redundancy mode is written; and
    a second data cache configured to store the second write-in data returned from the fault manager.

4. The multi-core processor of claim 3, wherein the second data cache does not generate a dirty bit for the second write-in data.

5. The multi-core processor of claim 3, wherein the second cache unit further comprises a second fault detector configured to detect a fault in the second write-in data stored in the second data cache.

6. The multi-core processor of claim 3, wherein the fault manager performs the fault detection operation when values respectively stored in the first DMR register and the second DMR register indicate the dual modular redundancy mode.

7. The multi-core processor of claim 1, wherein, in a dual core mode, the first processor and the second processor perform different tasks, and the fault manager inactivates the fault detection operation.

8. The multi-core processor of claim 1, further comprising a recovery module configured to receive a fault flag signal generated according to a result of the fault detection operation, and correct faults of the first processor and the second processor.

9. The multi-core processor of claim 8, further comprising a reset module configured to reset the first processor and the second processor in response to control by the recovery module.

10. The multi-core processor of claim 1, wherein the first processor and the second processor operate at different operating frequencies in the dual modular redundancy mode.

11. The multi-core processor of claim 10, wherein the operating frequency of the first processor is higher than the operating frequency of the second processor in the dual modular redundancy mode.

12. A cache management method for a multi-core processor having a dual modular redundancy (DMR) mode in which a first processor and a second processor perform a same task, the cache management method comprising:
    generating first write-in data by the first processor as a result of the first processor performing the task;

generating second write-in data by the second processor as a result of the second processor performing the task;

storing the first write-in data in a first write buffer of a first data cache;

storing the second write-in data in a second write buffer of a second data cache;

determining, based on information in a first DMR register connected to the first write buffer, whether to activate the DMR mode;

in response to the determining, comparing, in the DMR mode, the first write-in data and the second write-in data;

generating a fault trap signal for correcting an operation fault of the first processor and the second processor when the first write-in data is different from the second write-in data in the comparing; and writing the first write-in data stored in the first data cache to a main memory in the DMR mode or to a peripheral device according to a result of the comparing, wherein an operation of writing from the second data cache to the main memory or the peripheral device is prevented, and wherein the first data cache stores a dirty bit for managing update of the first write-in data.

13. The cache management method of claim 12, wherein an operating frequency of the first processor is higher than an operating frequency of the second processor in the dual modular redundancy mode.

* * * * *